United States Patent
Lin et al.

(10) Patent No.: US 9,846,340 B1
(45) Date of Patent: Dec. 19, 2017

(54) PIXEL STRUCTURE UTILIZING PHOTO SPACER STAGE DESIGN AND DISPLAY DEVICE HAVING THE SAME

(71) Applicant: a.u. Vista, Inc., Milpitas, CA (US)

(72) Inventors: Hung-Che Lin, Hsin-chu (TW); Shang Jie Wu, Hsin-chu (TW); Sheng-Ju Ho, Hsin-chu (TW); Yi Jung Chen, Hsin-chu (TW)

(73) Assignee: A.U. VISTA, INC., Milpitas, CA (US)

( * ) Notice: Subject to any disclaimer, the term of this patent is extended or adjusted under 35 U.S.C. 154(b) by 0 days.

(21) Appl. No.: 15/183,181

(22) Filed: Jun. 15, 2016

(51) Int. Cl.
G02F 1/1343 (2006.01)
G02F 1/1362 (2006.01)
G02F 1/1339 (2006.01)

(52) U.S. Cl.
CPC .... *G02F 1/134336* (2013.01); *G02F 1/13394* (2013.01); *G02F 1/136286* (2013.01); *G02F 2001/134345* (2013.01); *G02F 2201/52* (2013.01)

(58) Field of Classification Search
CPC .............. G02F 1/1333; G02F 1/13394; G02F 1/133345; G02F 1/136286; G02F 1/1368; G02F 1/1339; G02F 1/1335; G02F 1/133514; G02F 1/1343; G02F 1/134309; G02F 1/134336; G02F 2201/40; G02F 2001/133357; G02F 2001/133388; H01L 27/3246; H01L 27/3276; H01L 51/5256
USPC ....... 349/139, 138, 155, 106, 156, 107, 143, 349/144, 147, 148
See application file for complete search history.

(56) References Cited

U.S. PATENT DOCUMENTS

| | | | | |
|---|---|---|---|---|
| 6,646,691 | B1* | 11/2003 | Watanabe | G02F 1/133514 349/141 |
| 7,557,895 | B2* | 7/2009 | Sawasaki | G02F 1/13394 349/155 |
| 2005/0104508 | A1* | 5/2005 | Ozawa | H01L 27/3239 313/500 |

(Continued)

FOREIGN PATENT DOCUMENTS

| CN | 101162338 A | 4/2008 |
|---|---|---|
| CN | 101373300 A | 2/2009 |
| CN | 202677034 U | 1/2013 |

(Continued)

*Primary Examiner* — Thoi Duong
(74) *Attorney, Agent, or Firm* — Tim Tingkang Xia, Esq.; Locke Lord LLP

(57) ABSTRACT

A pixel structure, including pixels arranged in a matrix. Each pixel includes sub-pixels arranged along a row direction, including first type sub-pixels and at least one second type sub-pixel. The sub-pixels in different rows are arranged alternately such that each sub-pixel column includes the same numbers of the second type sub-pixels. Each sub-pixel has a color resist and a photo spacer disposed thereon. The color resists of the second type sub-pixels have a sectional difference from the color resists of the first type sub-pixels, and the sectional difference is greater than a height of the photo spacer of each of the first type sub-pixels. For each second type sub-pixel, a photo spacer (PS) stage is extended from a corresponding common voltage line, and the color resist is disposed on the corresponding PS stage to form the sectional difference. Thus, each common voltage line has the same number of PS stages.

20 Claims, 12 Drawing Sheets

(56) References Cited

U.S. PATENT DOCUMENTS

2008/0084376 A1    4/2008  Hirota et al.
2016/0071883 A1*   3/2016  Jin .................... G02F 1/134336
                                                            349/144

FOREIGN PATENT DOCUMENTS

| CN | 202837760 U | 3/2013 |
| CN | 104777639 A | 7/2015 |
| TW | I422910 B   | 1/2014 |

* cited by examiner

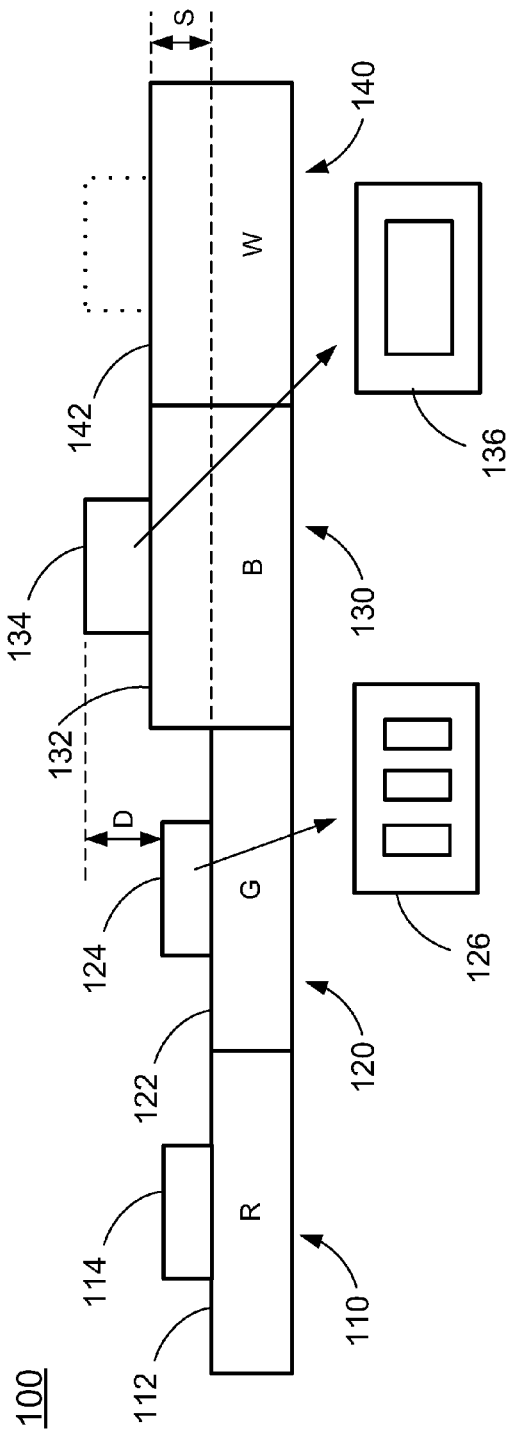
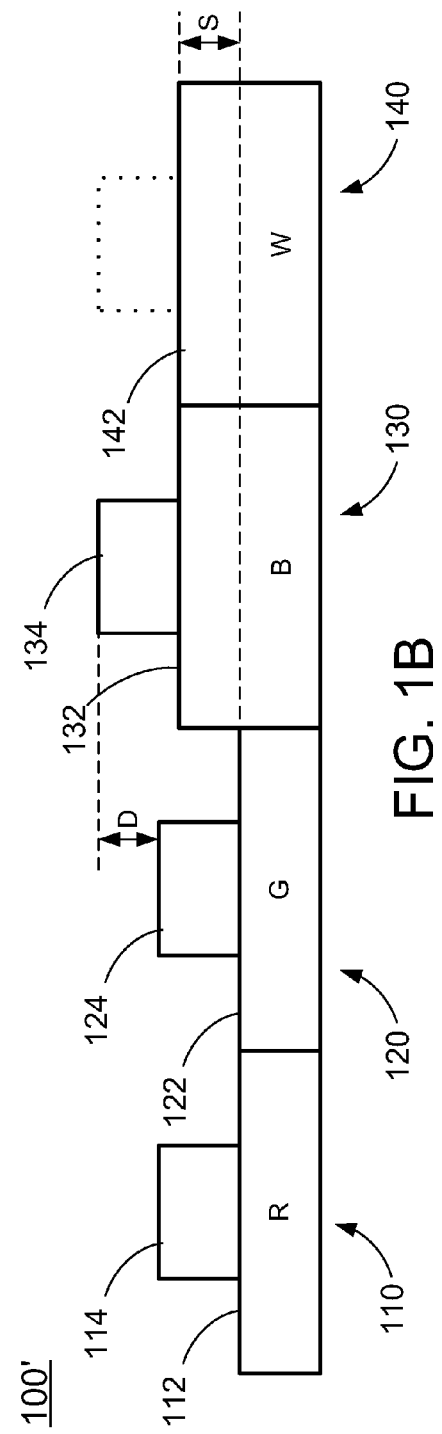

US 9,846,340 B1

PIXEL STRUCTURE UTILIZING PHOTO SPACER STAGE DESIGN AND DISPLAY DEVICE HAVING THE SAME

FIELD OF THE DISCLOSURE

The disclosure relates generally to display technology, and more particularly to a pixel structure utilizing photo spacer stage design and display devices having the same and adopting the RGBW color model or other color models.

BACKGROUND OF THE DISCLOSURE

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Currently, liquid crystal displays (LCDs) are commonly used as display devices. The LCD is capable of displaying images with good quality while consuming lower electrical power, and is thus used often as the display devices of battery powered electronic devices, such as laptop computers, mobile phones, digital cameras and other portable devices.

As disclosed in Tsujimura et al., U.S. Pat. No. 6,689,629, which is assigned to AU Optronics Corp., the parent company of the assignee of the current application, and hereby incorporated by reference in its entirety, the wirings, such as the scan lines and signal lines of the array, are preferably comprised of a low-resistance material, such as aluminum or an aluminum alloy, so as to increase the speed with which the scan lines and signal lines operate. However, aluminum tends to be easily oxidized. For that reason, Tsujimura et al. discloses forming wirings as a two-layer structure, with a lower layer of aluminum, aluminum alloy or other low-resistance material, and an upper layer of molybdenum, chromium, tantalum, titanium, alloys thereof, or oxidation-resistant conductive material. Tsujimura further discloses that the scan lines and signal lines contact connection pads, through which the array is connected to a driving system. Tsujimura discloses forming dummy conductive patterns, situated between the connection pads and the pixel electrodes, but not in contact with any of the wirings on the substrate. By increasing the density of conductive material in a given area, the dummy conductive patterns can reduce etching undercut and improve the tapered shape of the wiring.

In LCD panels, the semiconductor material making up the TFT channel may be amorphous silicon. However, as disclosed in Chen, U.S. Pat. No. 6,818,967, which is assigned to AU Optronics Corp., the parent company of the assignee of the current application, and hereby incorporated by reference in its entirety, poly-silicon channel TFTs offer advantages over amorphous silicon TFTs, including lower power and greater electron migration rates. Poly-silicon may be formed by converting amorphous silicon to poly-silicon via a laser crystallization or laser annealing technique. Use of the laser permits fabrication to occur at temperatures below 600° C., and the fabricating technique is thus called low temperature poly-silicon (LTPS). As disclosed in Chen, the re-crystallization process of LTPS results in the formation of mounds on the surface of the poly-silicon layer, and these mounds impact the current characteristics of the LTPS TFT. Chen discloses a method to reduce the size of the LTPS surface mounds, by performing a first anneal treatment, then performing a surface etching treatment, for example using a solution of hydrofluoric acid, and then performing a second anneal treatment. The resulting LTPS surface has mounds with a height/width ratio of less than 0.2. A gate isolation layer, gate, dielectric layer, and source and drain metal layers can then be deposited above the LTPS layer to form a complete LTPS TFT.

As explained in Sawasaki et al., U.S. Pat. No. 7,557,895, which is assigned to AU Optronics Corp., the parent company of the assignee of the current application, and hereby incorporated by reference in its entirety, the thickness of the liquid crystal layer typically must be uniformly controlled, in order to avoid unevenness in brightness across the LCD panel. As disclosed in Sawasaki et al., the required uniformity may be achieved by disposing a plurality of pillar spacers between the TFT substrate and the color filter substrate. As further disclosed in Sawasaki et al., the pillar spacers may be formed with different heights, such that some spacers have a height that is greater than the gap between the substrates and other spacers have a height that is less than the gap between the substrates. This configuration may permit the spacing between the substrates to vary with temperature changes but also prevent excessive deformation when forces are applied to the panel. Sawasaki et al. further discloses a method for assembling the substrates with the liquid crystal material between them. This method comprises steps of preparing the two substrates, coating a sealing material on the circumference of the outer periphery of one of the pair of substrates, dropping an appropriate volume of liquid crystal on one of the pair of substrates, and filling in the liquid crystal between the pair of substrates by attaching the pair of substrates in a vacuum followed by returning the attached pair of substrates to atmospheric pressure.

Generally, in a LCD device adopting color models such as RGB or RGBW models, a pixel may include a plurality of sub-pixels corresponding to different colors. For example, in the RGB display device, a pixel includes a red (R) sub-pixel, a green (G) sub-pixel, and a blue (B) sub-pixel. In the RGBW display device, a pixel include a R sub-pixel, a G sub-pixel, a B sub-pixel, and a white (W) sub-pixel. Specifically, each sub-pixel has a color resist of the corresponding color, and for the R, G and B sub-pixels, a photo spacer may be disposed on the color resist to separate the color resist layer and other layers of the display device.

Due to the different penetration frequency of different colors, a sectional difference may exist between the color resist of the B sub-pixel and the color resists of the R and G sub-pixels, and the height of the photo spacers may be designed differently to provide sufficient liquid crystal margin for the pixel. However, when the LCD device utilizes a black matrix on array (BOA) model, the adjustment of the height of the photo spacers may be limited due to the material of the photo spacers, thus reducing the liquid crystal margin for the pixel.

Therefore, a heretofore unaddressed need exists in the art to address the aforementioned deficiencies and inadequacies.

SUMMARY OF THE DISCLOSURE

One aspect of the disclosure relates to a pixel structure of a display device, which includes: (a) a plurality of pixels arranged in a matrix having 2*M rows and N columns, M and N being integers greater than one, each of the pixels including a plurality of sub-pixels, and the sub-pixels of each of the pixels including a red (R) sub-pixel, a green (G) sub-pixel, a blue (B) sub-pixel, and a white (W) sub-pixel; and (b) at least 4*N common voltage lines, each electrically connected to a corresponding column of the sub-pixels. The sub-pixels are arranged along a row direction to form 4*N columns of the sub-pixels. For each of the pixels in the odd rows of the matrix, the sub-pixels of the pixel are arranged along the row direction in a first sequential order of the R sub-pixel, the G sub-pixel, the B sub-pixel and the W sub-pixel, and for each of the pixels in the even rows of the matrix, the sub-pixels of the pixel are arranged along the row direction in a second sequential order of the B sub-pixel, the W sub-pixel, the R sub-pixel and the G sub-pixel, such that each of the odd columns of the sub-pixels comprises M R sub-pixels and M B sub-pixels alternately disposed, and each of the even columns of the sub-pixels comprises M G sub-pixels and M W sub-pixels alternately disposed. Each of the sub-pixels has a color resist of the corresponding color, and each of the R, G and B sub-pixels has a photo spacer disposed on the color resist. The color resists of the B sub-pixels and the W sub-pixels have a sectional difference from the color resists of the R sub-pixels and the G sub-pixels, and the sectional difference is greater than a height of the photo spacer of each of the R and G sub-pixels. For each of the B sub-pixels and the W sub-pixels, a stage is extended from the corresponding common voltage line, and the color resist of each of the B and W sub-pixels is disposed on the corresponding stage to form the sectional difference, such that each of the common voltage lines has M stages.

In certain embodiments, the pixel structure further includes: (a) at least 2*M gate lines, each electrically connected to a corresponding row of the pixels; (b) at least 2*M array com lines, each electrically connected to a corresponding row of the pixels; and (c) at least 4*N data lines, each electrically connected to a corresponding column of the sub-pixels.

In another aspect of the present disclosure, a pixel structure of a display device is provided. In certain embodiments, the pixel structure includes: (a) a plurality of pixels arranged in a matrix having L rows and N columns, where each of the pixels includes K sub-pixels, L, N and K being integers greater than one, and the sub-pixels of each of the pixels include a plurality of first type sub-pixels and at least one second type sub-pixel; and (b) at least K*N common voltage lines, each electrically connected to a corresponding column of the sub-pixels. The sub-pixels are arranged along a row direction to form K*N columns of the sub-pixels. For each row of the matrix, the sub-pixels are arranged alternately such that each of the K*N columns of the sub-pixels comprises the same numbers of the first type sub-pixels and the same numbers of the second type sub-pixels. Each of the sub-pixels has a color resist of a corresponding color. The color resist of each of the first type sub-pixels has a first height, and the color resist of each of the second type sub-pixels has a second height. Each of the first type sub-pixels and at least one of the second type sub-pixels respectively have a photo spacer disposed on the color resist. For each of the pixels, the color resists of the second type sub-pixels have a sectional difference from the color resists of the first type sub-pixels, and the second height is greater than the first height. For each of the second type sub-pixels, a stage is extended from the corresponding common voltage line, and the color resist of each of the second type sub-pixels is disposed on the corresponding stage to form the sectional difference. Thus, each of the common voltage lines has substantially the same number of stages.

In certain embodiments, the pixel structure further includes: (a) at least L gate lines, each electrically connected to a corresponding row of the pixels; (b) at least L array com lines, each electrically connected to a corresponding row of the pixels; and (c) at least K*N data lines, each electrically connected to a corresponding column of the sub-pixels.

In certain embodiments, each of the pixels includes K=4 sub-pixels, including a first sub-pixel corresponding to a first color, a second sub-pixel corresponding to a second color, a third sub-pixel corresponding to a third color, and a fourth sub-pixel corresponding to a fourth color, where the first and second sub-pixels are the first type sub-pixels, and the third and fourth sub-pixels are the second type sub-pixels. In certain embodiments, the first color is red (R), the second color is green (G), the third color is blue (B), and the fourth color is white (W). In certain embodiments, the pixel structure is utilized in a liquid crystal display (LCD) having a RGBW color model, which may display the three primary colors of red (R), green (G) and blue (B), as well as the white (W) color.

In certain embodiments, the matrix has L=2*M rows, M being an integer greater than one, and for each of the pixels in the odd rows of the matrix, the sub-pixels of the pixel are arranged along the row direction in a first sequential order of the first sub-pixel, the second sub-pixel, the third sub-pixel and the fourth sub-pixel, and for each of the pixels in the even rows of the matrix, the sub-pixels of the pixel are arranged along the row direction in a second sequential order of the third sub-pixel, the fourth sub-pixel, the first sub-pixel and the second sub-pixel, such that each of the odd columns of the sub-pixels includes M first sub-pixels and M third sub-pixels alternately disposed, and each of the even columns of the sub-pixels includes M second sub-pixels and M fourth sub-pixels alternately disposed.

In certain embodiments, the matrix has L=4*X rows, X being an integer greater than one, and for each row of the pixels, the arrangement of the sub-pixels changes such that each of the two adjacent sub-pixels in two adjacent rows corresponds to two different colors, and each of the columns of the sub-pixels comprises 2*X first type sub-pixels and 2*X second type sub-pixels.

In certain embodiments, for each row of the pixels, the sub-pixels are arranged by shifting one sub-pixel from a previous row, such that each of the columns of the sub-pixels comprises X first sub-pixels, X second sub-pixels, X third sub-pixels and X fourth sub-pixels alternately disposed.

In certain embodiments, for each row of the pixels, the sub-pixels are arranged by shifting two sub-pixels from a previous row.

In certain embodiments, for each of the two adjacent rows of the pixels, the sub-pixels of one row are arranged backwards from the sub-pixels of the other row, such that each of the columns of the sub-pixels comprises X first sub-pixels, X second sub-pixels, X third sub-pixels and X fourth sub-pixels alternately disposed.

In certain embodiments, each of the pixels includes K=3 sub-pixels, including a first sub-pixel corresponding to a first color, a second sub-pixel corresponding to a second color, and a third sub-pixel corresponding to a third color, where the first and second sub-pixels are the first type sub-pixels, and the third sub-pixel is the second type sub-pixel. In certain embodiment, the first color is red (R), the second color is green (G), and the third color is blue (B).

In certain embodiment, the matrix has L=3*Z rows, Z being an integer greater than one, and for each row of the pixels, the arrangement of the sub-pixels changes such that each of the two adjacent sub-pixels in two adjacent rows corresponds to two different colors, and each of the columns of the sub-pixels comprises 2*Z first type sub-pixels and Z second type sub-pixels. In certain embodiment, for each row of the pixels, the sub-pixels are arranged by shifting one sub-pixel from a previous row, such that each of the columns of the sub-pixels includes Z first sub-pixels, Z second sub-pixels and Z third sub-pixels alternately disposed.

In certain embodiments, each of the plurality of stages is stacked on a metal layer, and each of the common voltage lines substantially elongates along an elongating direction, wherein a width of each of the stages on the metal layer along a direction perpendicular to the elongating direction is substantially greater than a width of each of the common voltage lines not stacked on the metal layer along the direction.

A further aspect of the of the present disclosure relates to a pixel structure of a display device. In certain embodiments, the pixel structure includes: (a) a plurality of pixels arranged in a matrix having L rows and N columns, where each of the pixels includes K sub-pixels, L, N and K being integers greater than one, and the sub-pixels of each of the pixels include a plurality of first type sub-pixels and at least one second type sub-pixel; and (b) at least K*N common voltage lines, each electrically connected to a corresponding column of the sub-pixels. The sub-pixels are arranged along a row direction to form K*N columns of the sub-pixels. For each row of the matrix, the sub-pixels are arranged alternately such that each of the K*N columns of the sub-pixels comprises the same numbers of the first type sub-pixels and the same numbers of the second type sub-pixels. Each of the sub-pixels has a color resist of a corresponding color. Each of the first type sub-pixels and at least one of the second type sub-pixels respectively have a photo spacer disposed on the color resist. At least one of the second type sub-pixels does not have a photo spacer. For each of the pixels, the color resists of the second type sub-pixels have a sectional difference from the color resists of the first type sub-pixels, and the sectional difference is greater than a height of the photo spacer of each of the first type sub-pixels. For each of the second type sub-pixels, a photo spacer (PS) stage is extended from the corresponding common voltage line, and the color resist of each of the second type sub-pixels is disposed on the corresponding PS stage to form the sectional difference. Thus, each of the common voltage lines has substantially the same number of PS stages.

In certain embodiments, each of the pixels comprises K=4 sub-pixels, comprising a first sub-pixel corresponding to a first color, a second sub-pixel corresponding to a second color, a third sub-pixel corresponding to a third color, and a fourth sub-pixel corresponding to a fourth color, where the first and second sub-pixels are the first type sub-pixels, and the third and fourth sub-pixels are the second type sub-pixels, and each of the first, second and third sub-pixels respectively has the photo spacer, and the fourth sub-pixel has no photo spacer.

A further aspect of the present disclosure relates to a pixel structure of a display device, which includes: a plurality of photo spacers; a first common voltage line elongating along an elongating direction, where a plurality of first stages extends from the first common voltage line, and each of the plurality of first stages elevates at least one of the plurality of photo spacer; and a second common voltage line elongating along the elongating direction located by the first common voltage line, where a plurality of second stages extends from the second common voltage line, and each of the plurality of second stages is not stacked under any of the plurality of photo spacers.

In certain embodiments, a first number of the first stages is substantially identical to a second number of the second stages.

In certain embodiments, each of the first stages has a first width along a direction perpendicular to the elongating direction, and each of the second stages has a second width along the direction perpendicular to the elongating direction, wherein the first width and the second width are substantially identical.

In certain embodiments, a plurality of third stages extends from the first common voltage line, each of the plurality of third stages is not stacked under any of the plurality of photo spacers, and a plurality of fourth stages extend from the second common voltage line, and each of the plurality of the fourth stages elevates at least one of the plurality of photo spacers.

In certain embodiments, a first sum of numbers of the first and third stages extending from the first common line is substantially identical to a second sum of numbers of the second and fourth stages.

In certain embodiments, each of the first stages has a first width along a direction perpendicular to the elongating direction, each of the second stages has a second width along the direction perpendicular to the elongating direction, each of the third stages has a third width along the direction perpendicular to the elongating direction, and each of the fourth stages has a fourth width along the direction perpendicular to the elongating direction, wherein the first, second, third and fourth widths are substantially identical.

In certain embodiments, the pixel structure further includes: a plurality of first color resists, each having a first height; and a plurality of second color resists, each having a second height, wherein each of the plurality of second color resists is stacked under at least one of the photo spacers. In certain embodiments, each of the plurality of second stages is stacked under one of the plurality of second color resists, and the second height of each of the second color resists is greater than the first height of each of the first color resists.

A further aspect of the present disclosure relates to a display device, which utilizes the pixel structure as recited above. In certain embodiments, the display device may be a liquid crystal display (LCD) having a black matrix on array (BOA) model.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein:

FIG. 1A schematically shows a cross-sectional view of the sub-pixels of a pixel without the PS stage in a color-filter on array (COA) model according to certain embodiments of the present disclosure.

FIG. 1B schematically shows a cross-sectional view of the sub-pixels of a pixel without the PS stage in a black matrix on array (BOA) model according to certain embodiments of the present disclosure.

DETAILED DESCRIPTION OF THE DISCLOSURE

Figure 2A:
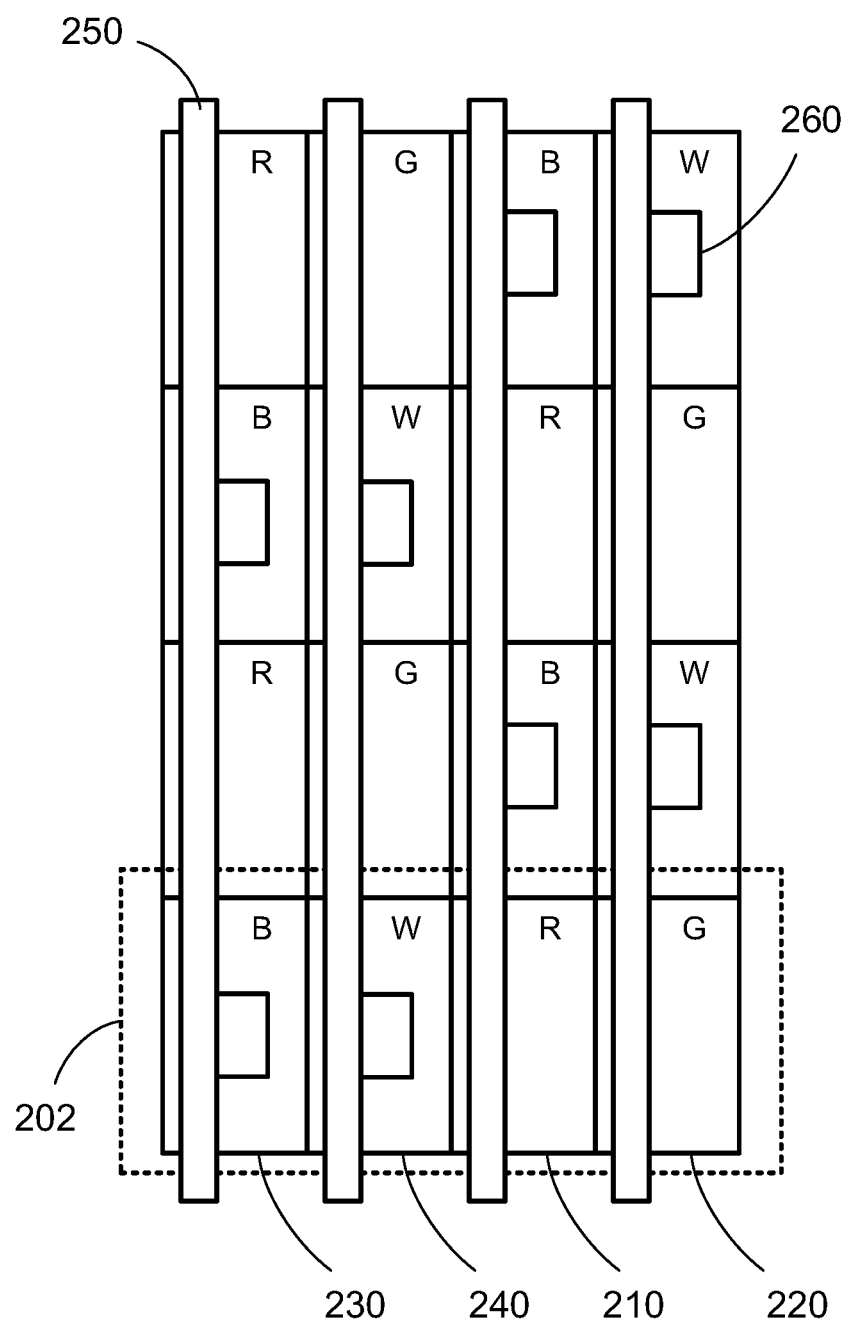
FIG. 2A schematically shows a top view of a plurality of pixels in consecutive rows according to certain embodiments of the present disclosure.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present disclosure in conjunction with the accompanying drawings. In accordance with the purposes of this disclosure, as embodied and broadly described herein, this disclosure, in certain aspects, relates to a pixel structure utilizing photo spacer stage design and a display device having the same. In certain embodiments, the display device may be a liquid crystal display (LCD) adopting the RGBW color model or other color models.

One aspect of the disclosure relates to a pixel structure of a display device, which includes: (a) a plurality of pixels arranged in a matrix having 2*M rows and N columns, M and N being integers greater than one, each of the pixels including a plurality of sub-pixels, and the sub-pixels of each of the pixels including a red (R) sub-pixel, a green (G) sub-pixel, a blue (B) sub-pixel, and a white (W) sub-pixel; and (b) at least 4*N common voltage lines, each electrically connected to a corresponding column of the sub-pixels. The sub-pixels are arranged along a row direction to form **4*N** columns of the sub-pixels. For each of the pixels in the odd rows of the matrix, the sub-pixels of the pixel are arranged along the row direction in a first sequential order of the R sub-pixel, the G sub-pixel, the B sub-pixel and the W sub-pixel, and for each of the pixels in the even rows of the matrix, the sub-pixels of the pixel are arranged along the row direction in a second sequential order of the B sub-pixel, the W sub-pixel, the R sub-pixel and the G sub-pixel, such that each of the odd columns of the sub-pixels includes M R sub-pixels and M B sub-pixels alternately disposed, and each of the even columns of the sub-pixels includes M G sub-pixels and M W sub-pixels alternately disposed. Each of the sub-pixels has a color resist of the corresponding color, and each of the R, G and B sub-pixels has a photo spacer disposed on the color resist. The color resists of the B sub-pixels and the W sub-pixels have a sectional difference from the color resists of the R sub-pixels and the G sub-pixels, and the sectional difference is greater than a height of the photo spacer of each of the R and G sub-pixels. For each of the B sub-pixels and the W sub-pixels, a stage is extended from the corresponding common voltage line, and the color resist of each of the B and W sub-pixels is disposed on the corresponding stage to form the sectional difference, such that each of the common voltage lines has M stages.

In another aspect of the present disclosure, a pixel structure of a display device is provided. In certain embodiments, the pixel structure includes: (a) a plurality of pixels arranged in a matrix having L rows and N columns, where each of the pixels includes K sub-pixels, L, N and K being integers greater than one, and the sub-pixels of each of the pixels include a plurality of first type sub-pixels and at least one second type sub-pixel; and (b) at least K*N common voltage lines, each electrically connected to a corresponding column of the sub-pixels. The sub-pixels are arranged along a row direction to form K*N columns of the sub-pixels. For each row of the matrix, the sub-pixels are arranged alternately such that each of the K*N columns of the sub-pixels includes the same numbers of the first type sub-pixels and the same numbers of the second type sub-pixels. Each of the sub-pixels has a color resist of a corresponding color. The color resist of each of the first type sub-pixels has a first height, and the color resist of each of the second type sub-pixels has a second height. Each of the first type sub-pixels and at least one of the second type sub-pixels respectively have a photo spacer disposed on the color resist. For each of the pixels, the color resists of the second type sub-pixels have a sectional difference from the color resists of the first type sub-pixels, and the second height is greater than the first height. For each of the second type sub-pixels, a stage is extended from the corresponding common voltage line, and the color resist of each of the second type sub-pixels is disposed on the corresponding stage to form the sectional difference. Thus, each of the common voltage lines has the same number of stages.

A further aspect of the present disclosure relates to a pixel structure of a display device, which includes: a plurality of photo spacers; a first common voltage line elongating along an elongating direction, where a plurality of first stages extends from the first common voltage line, and each of the plurality of first stages elevates at least one of the plurality of photo spacer; and a second common voltage line elongating along the elongating direction located by the first common voltage line, where a plurality of second stages extends from the second common voltage line, and each of the plurality of second stages is not stacked under any of the plurality of photo spacers.

As discussed above, due to the different wavelength ranges and penetration frequencies of different colors on the visible spectrum, a sectional difference may exist between the color resist of the B sub-pixel and the color resists of the R and G sub-pixels, and the height of the photo spacers may be designed differently to provide sufficient liquid crystal margin for the pixel. For example, FIG. 1A schematically shows a cross-sectional view of the sub-pixels of a pixel without the PS stage in a color-filter on array (COA) model according to certain embodiments of the present disclosure. As shown in FIG. 1A, the pixel 100 is in a RGBW color model, which includes a R sub-pixel 110, a G sub-pixel 120, a B sub-pixel 130 and a W sub-pixel 140. The R sub-pixel 110 includes a corresponding color resist 112 and a photo spacer 114 disposed on the color resist 112. The G sub-pixel 120 includes a corresponding color resist 122 and a photo spacer 124 disposed on the color resist 122. The B sub-pixel 130 includes a corresponding color resist 132 and a photo spacer 134 disposed on the color resist 132. The W sub-pixel 140 includes a corresponding color resist 142, but does not include a photo spacer. Further, a sectional difference S exist between the color resist 132 of the B sub-pixel 130 and the color resists 112 and 122 of the R and G sub-pixels 110 and 120. In certain embodiments, the sectional difference S may be about 0.2 um. Further, it should be noted that the height of the photo spacer 134 of the B sub-pixel is greater than those of the photo spacers 114 and 124 of the R and G sub-pixels 110 and 120, such that a gap distance D greater than the sectional difference S may exist between the photo spacers 134 and 114/124. In certain embodiments, the height difference of the photo spacers may be achieved by using different photo reticles or masks. For example, a full-pattern reticle 136 may be used in manufacturing the photo spacer 134 of the B sub-pixel 130, and a stripe-pattern reticle 126 may be used in manufacturing the photo spacers 114/124 of the R and G sub-pixels 110 and 120, in order to reduce the height of each of the photo spacers 114 and 124. In certain embodiments, the gap distance D may be about 0.4-0.5 um to provide sufficient liquid crystal margin for the pixel 100.

However, as discussed above, when the pixel structure is the black matrix on array (BOA) model, the adjustment of the height of the photo spacers may be limited due to the material of the photo spacers. For example, FIG. 1B schematically shows a cross-sectional view of the sub-pixels of a pixel without the PS stage in a BOA model according to certain embodiments of the present disclosure. The difference between the pixel 100' as shown in FIG. 1B and the pixel 100 as shown in FIG. 1A exists in that the photo spacers 114 and 124 of the R and G sub-pixels 110 and 120 have increased heights. Due to the material limitation for the BOA model, the heights of the photo spacers 114 and 124 cannot be significantly reduced utilizing the stripe-pattern reticle 126 as shown in FIG. 1B in the manufacturing process. Accordingly, the gap distance D between the photo spacers may be reduced, thus reducing the liquid crystal margin for the pixel structure. In certain embodiments, when the sectional difference S is about 0.2 um, the gap distance D may be no greater than 0.3 um.

In order to solve the problem, a stage may be utilized to form the sectional difference between the sub-pixels. FIG. 2A schematically shows a top view of a plurality of pixels in consecutive rows according to certain embodiments of the present disclosure. Specifically, the pixel structure 200 as shown in FIG. 2A may be in a RGBW color model and include multiple pixels 202 arranged in a matrix, and FIG. 2A shows four consecutive rows of the pixels 202 of the pixel structure 200. Each of the pixels 202 includes a R sub-pixel 210, a G sub-pixel 220, a B sub-pixel 230 and a W sub-pixel 240. As shown in FIG. 2A, the sub-pixels are arranged along a row direction to form four columns of the sub-pixels. For each of the pixels 202 in the odd rows of the matrix, the sub-pixels are arranged along the row direction in a first sequential order of the R sub-pixel 210, the G sub-pixel 220, the B sub-pixel 230 and the W sub-pixel 240; and for each of the pixels 202 in the even rows of the matrix, the sub-pixels are arranged along the row direction in a second sequential order of the B sub-pixel 230, the W sub-pixel 240, the R sub-pixel 210 and the G sub-pixel 220. Thus, for the four consecutive rows of pixels 202 as shown in FIG. 2A, each of the odd columns of the sub-pixels includes two R sub-pixels 210 and two B sub-pixels 230 alternately disposed, and each of the even columns of the sub-pixels includes two G sub-pixels 220 and two W sub-pixels 240 alternately disposed. Further, the pixel structure 200 includes a plurality of common voltage lines 250, and each common voltage line 250 is electrically connected to a corresponding column of the sub-pixels for transmitting the common voltage for the sub-pixels. In addition, each of the common voltage lines mentioned above may be a TD com line, which are electrical coupled to the source and/or drain electrode of the thin-film transistor (TFT) of the sub-pixel to which the TD com line provides the common voltage through the active layer of the TFT. In addition, the TD com line might be used to facilitate the voltage difference between a main sub-pixel and a secondary sub-pixel by sharing the voltage of the secondary sub-pixel such that the voltage difference between the main sub-pixel and the secondary sub-pixel can realize better viewing angle. TD com lines can be formed on the same substrate as the TFTs of the sub-pixel and electrically coupled to at least one predetermined voltage level. Moreover, for each of the B sub-pixels 230 and the W sub-pixels 240, a stage 260 is extended from the corresponding common voltage line 250 crossing and electrically connected to the sub-pixel. Thus, for the four consecutive rows of pixels 202 as shown in FIG. 2A, each of the common voltage lines 250 has two stages 260.

Figure 2B:
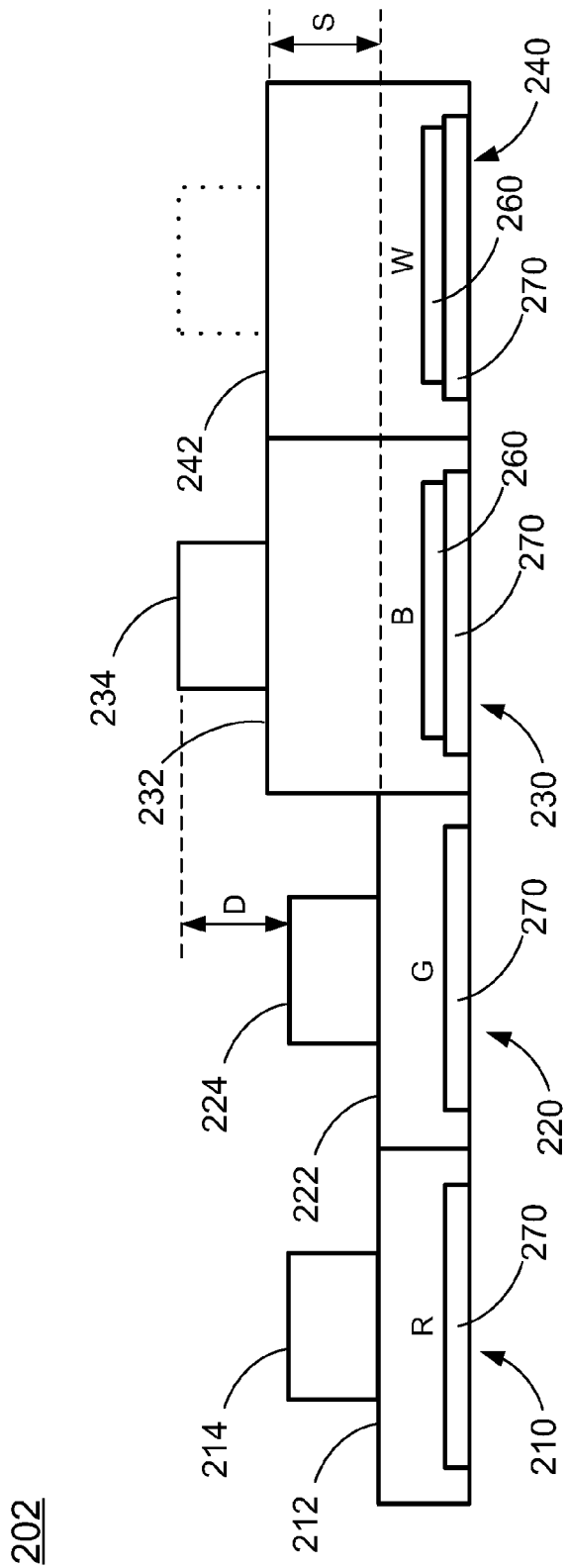
FIG. 2B schematically shows a cross-sectional view of the sub-pixels of a pixel according to certain embodiments of the present disclosure.

FIG. 2B schematically shows a cross-sectional view of the sub-pixels of a pixel according to certain embodiments of the present disclosure. As shown in FIG. 2B, the pixel 202 is in an odd row, such that the sub-pixels are arranged along the row direction in the first sequential order of the R sub-pixel 210, the G sub-pixel 220, the B sub-pixel 230 and the W sub-pixel 240. Each of the R sub-pixel 210, the G sub-pixel 220, the B sub-pixel 230 and the W sub-pixel 240 has a metal layer 270 at the bottom of the sub-pixel. In certain embodiments, the metal layer 270 may be a layer forming the array com line. The R sub-pixel 210, the G sub-pixel 220, and the B sub-pixel 230 respectively have corresponding photo spacers 214, 224 and 234. The W sub-pixel 240 does not have a photo spacer. For the B sub-pixel 230 and the W sub-pixel 240, the color resist 242 of the W sub-pixel 240 (which is referred to as a first color resist) is not stacked under any photo spacer, and the color resist 232 of the B sub-pixel 230 (which is referred to as the second color resist) is stacked under the photo spacer 234 of the B sub-pixel 230. Further, the difference between the pixel 202 as shown in FIG. 2B and the pixel 100' as shown in FIG. 1B exists in that the B and W sub-pixels 230 and 240 each include a stage 260 at the bottom thereof. For each of the B and W sub-pixels 230 and 240, the stage 260 is disposed on the metal layer 270. The color resists 232 and 242 of the B and W sub-pixels 230 and 240 are respectively disposed on the corresponding stage 260. The height of the color resist 212 of the R sub-pixel 210 and the height of the color resist 222 of the G sub-pixel 220 are substantially identical, and are hereinafter referred to as a first height. The height of the color resist 232 of the B sub-pixel 230 and the height of the color resist 242 of the W sub-pixel 240 are substantially identical, and are hereinafter referred to as a second height. As shown in FIG. 2B, the second height is greater than the first height. Due to the addition of the stage 260, the sectional difference S is increased to be greater than the height of the photo spacers 214 and 224 of the R and G sub-pixels 210 and 220 without changing the thickness of the color resists, and the gap distance D is also increased accordingly to ensure sufficient liquid crystal margin for the pixel structure. It should be noted that the stages 260 of the B and W sub-pixels 230 and 240 serve for different purposes. For the stage 260 of the B sub-pixel 230, the stage 260 is used to be stacked under the photo spacer 234 in order to elevate the photo spacer 234. Thus, the stage 260 of the B sub-pixel 230 may be referred to as a first stage or a photo spacer stage (abbreviated as a PS stage). For the stage 260 of the W sub-pixel 240, the stage 260 is not stacked under any photo spacer since the W sub-pixel 240 does not have any photo spacer. Thus, the stage 260 of the W sub-pixel 230 may be referred to as a second stage, which is not a PS stage, and is provided merely for balancing loading purposes.

It should be particularly noted that the layers of the sub-pixels as shown in FIG. 2B are provided solely for illustrative purposes, and the relative sizes, shapes and positions of the layers may vary. For example, as shown in FIG. 2B, for each of the sub-pixels, the width of the metal layer 270 and the width of the PS stage 260 are respectively smaller than the cross-sectional width of the sub-pixel. However, the width of the metal layer 270 and the width of the PS stage 260 may vary, and are thus not limited to the widths as shown in FIG. 2B. For example, the metal layer 270 may extend to have the same width of the sub-pixel.

Figure 3:
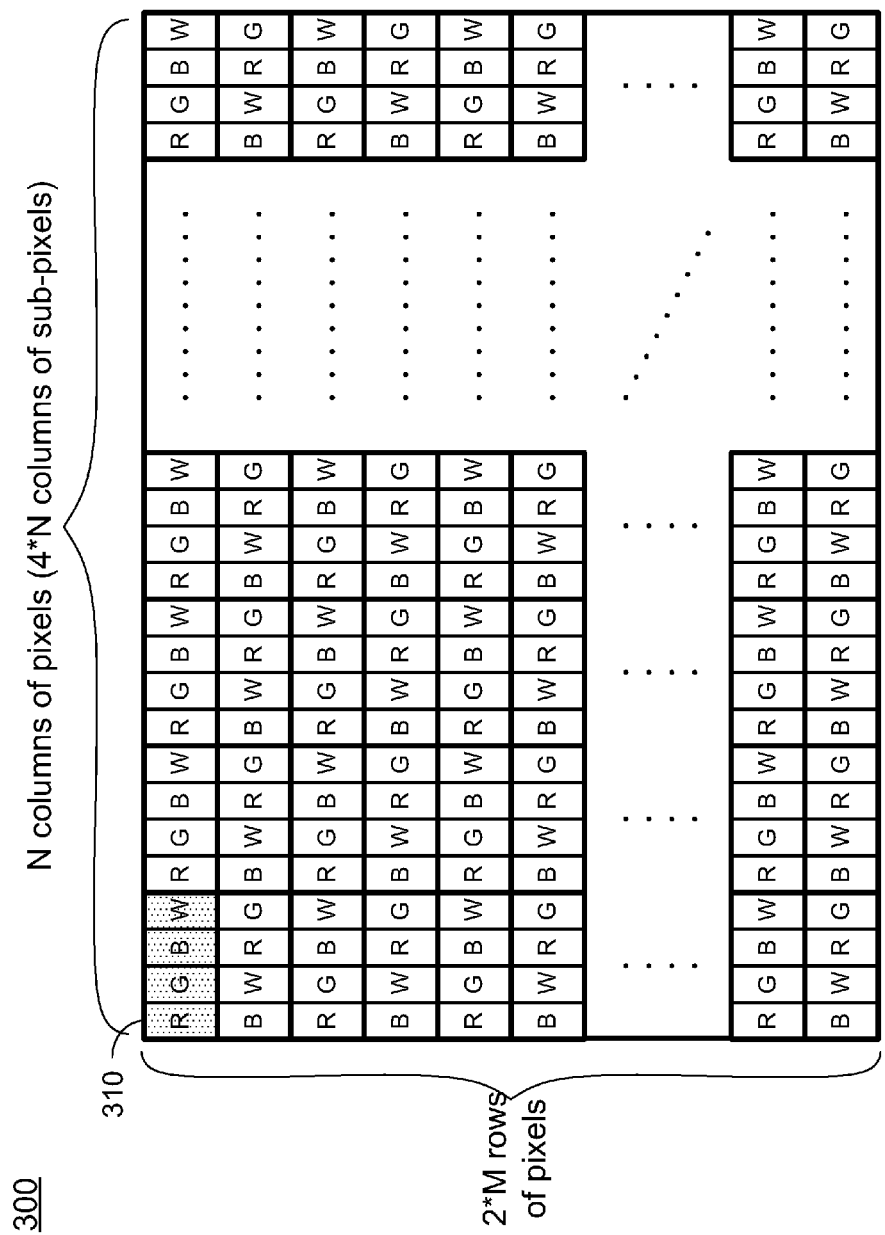
FIG. 3 schematically shows a top view of a pixel structure of a liquid crystal display device according to certain embodiments of the disclosure.

FIG. 3 schematically shows a top view of a pixel structure of a liquid crystal display device according to certain embodiments of the disclosure. Specifically, FIG. 3 shows the pixels 310 but not the common voltage lines. As shown in FIG. 3, the pixel structure 300 includes a matrix of 2*M rows and N columns of pixels 310, where M and N are positive integers greater than one. Since the pixel structure adopts the RGBW color model, each pixel includes four sub-pixels. In other words, the matrix includes 4*N columns of sub-pixels. For each of the pixels 310 in the odd rows (the first, third, fifth, . . . , and the (2*M−1)-th row) of the matrix, the sub-pixels are arranged along the row direction in the first sequential order of the R sub-pixel, the G sub-pixel, the B sub-pixel and the W sub-pixel; and for each of the pixels 310 in the even rows (the second, fourth, sixth, . . . , and the (2*M)-th row) of the matrix, the sub-pixels are arranged along the row direction in the second sequential order of the B sub-pixel, the W sub-pixel, the R sub-pixel and the G sub-pixel. Thus, each of the odd columns of the sub-pixels includes M R sub-pixels and M B sub-pixels alternately disposed, and each of the even columns of the sub-pixels includes M G sub-pixels and M W sub-pixels alternately disposed. Since the stages are provided in the B and W sub-pixels, each of the common voltage lines may have M stages.

Figure 4:
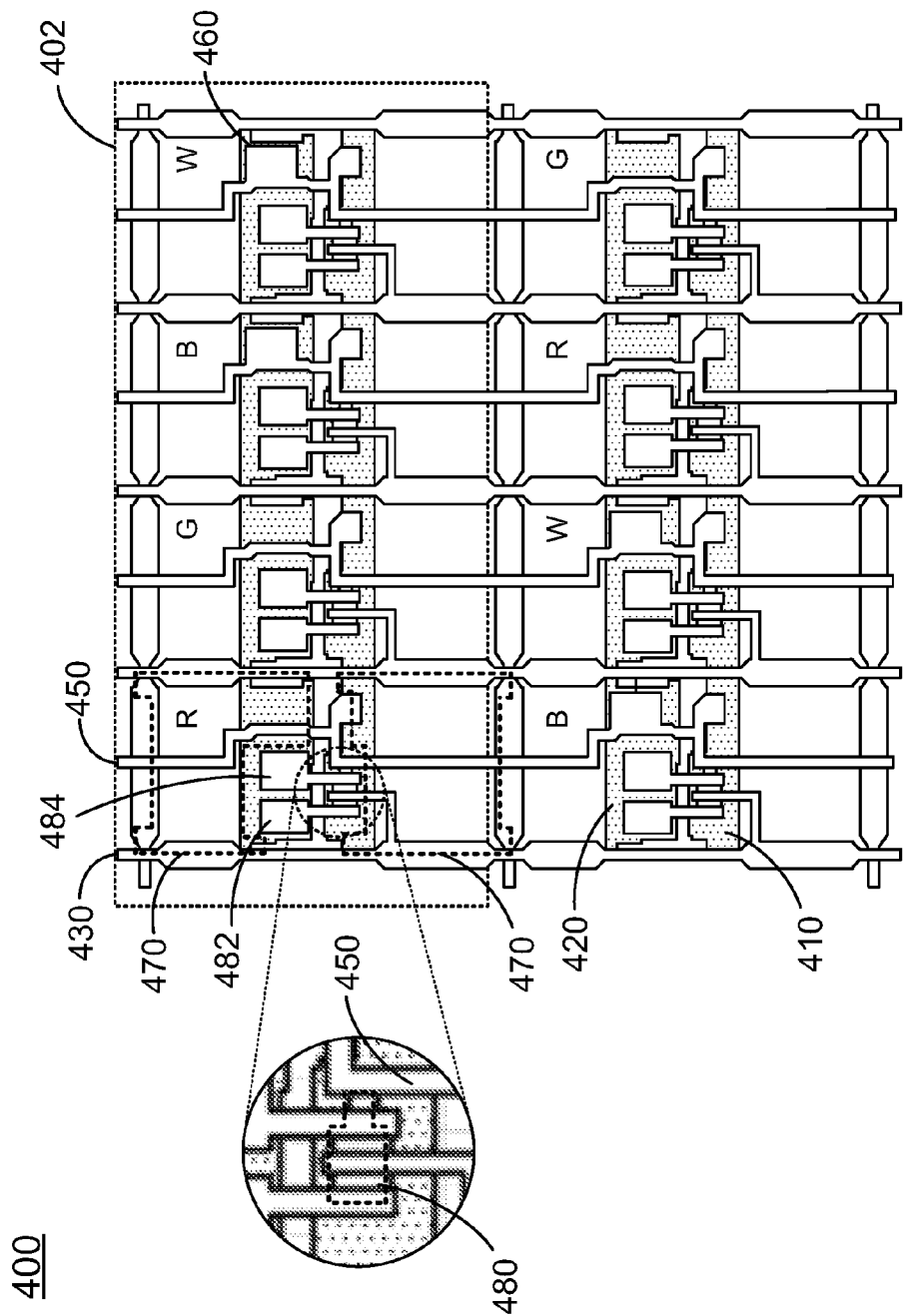
FIG. 4 schematically shows a plurality of pixels in consecutive rows according to certain embodiments of the present disclosure.

FIG. 4 schematically shows a plurality of pixels in consecutive rows according to certain embodiments of the present disclosure. Specifically, FIG. 4 shows two consecutive rows of the pixels 402 of the pixel structure 400, where the electrical components of the sub-pixels are shown in further details. It should be particularly noted that the electrical components of the pixel structure 400 are provided solely for illustrative purposes, and the relative sizes, shapes and positions of the electrical components may vary. Further, the pixel structure 400 may include additional electrical components not shown in the drawings.

As shown in FIG. 4, the pixel structure 400 includes a plurality of gate lines 410, each electrically connected to a corresponding row of the pixels; a plurality of array com lines 420, each electrically connected to a corresponding row of the pixels; a plurality of data lines 430, each electrically connected to a corresponding column of the sub-pixels; and a plurality of common voltage lines 450. In certain embodiments, each of the array com lines 420 may be formed as the metal layer 270 as shown in FIG. 2B. Further, each sub-pixel of the pixel 402, a plurality of secondary sub-pixels 470 (shown in bolded dot lines) may be defined, and the area between the plurality of secondary sub-pixels 470 is the main sub-pixel. Moreover, for each sub-pixel, at least one TFT is provided. As shown in FIG. 4, each of the sub-pixels has two TFTs, and a drain electrode 482 for the main sub-pixel and a drain electrode 484 for the secondary sub-pixel are provided. As shown in the enlarged view of FIG. 4, the TFT has an active layer 480 (shown in dot line), and the common voltage line 450 (e.g., the TD com line) provides the common voltage through the active layer 480 of the TFT to share the charge delivered to the secondary sub-pixel 470. In this way, the voltage difference between the main sub-pixel and the secondary sub-pixel may be facilitated. For each of the B sub-pixels and the W sub-pixels, a stage 460 is extended from the corresponding common voltage line 450. Thus, for the two consecutive rows of the pixels 402 as shown in FIG. 4, each of the odd columns of the sub-pixels includes one R sub-pixel and one B sub-pixel alternately disposed, and each of the even columns of the sub-pixels includes one G sub-pixel and one W sub-pixel alternately disposed. Further, each of the common voltage lines 450 has one stage 460. In other words, if the pixel structure 400 has 2*M rows of pixels 402, each of the odd columns of the sub-pixels includes M R sub-pixels and M B sub-pixels alternately disposed, and each of the even columns of the sub-pixels includes M G sub-pixels and M W sub-pixels alternately disposed. Further, each of the common voltage lines 450 may have M stages 460.

As described above, in certain embodiments, each of the array com lines 420 may be formed as the metal layer 270 as shown in FIG. 2B. In this case, each of the PS stages 460 is stacked on the metal layer (i.e., the array com line 420). Further, each of the common voltage lines 450 substantially elongates along an elongating direction (i.e., the vertical direction as shown in FIG. 2B). Since each of the PS stages 460 is extended from the corresponding common voltage line 450, the width of each of the PS stages 460 on the metal layer (i.e., the array com line 420) along a horizontal direction (i.e., the direction perpendicular to the elongating direction of the common voltage lines 450) is substantially greater than a width of the most portions of each of the of common voltage lines 450 not stacked on the metal layer along the horizontal direction.

In certain embodiments, among all of the sub-pixels, the R and G sub-pixels do not include the stage, and the B and W sub-pixels include the stage. In other words, the sub-pixels may be categorized as two different types based on the existence of the stage. In certain embodiments, the sub-pixels may be categorized as first type sub-pixels (the sub-pixels without stage) and second type sub-pixels (the sub-pixels with stage). In certain embodiments, the first type sub-pixels may be referred to as the sub-PS sub-pixels, and the second type sub-pixels may be referred to as the main-PS sub-pixels.

Figure 5B:
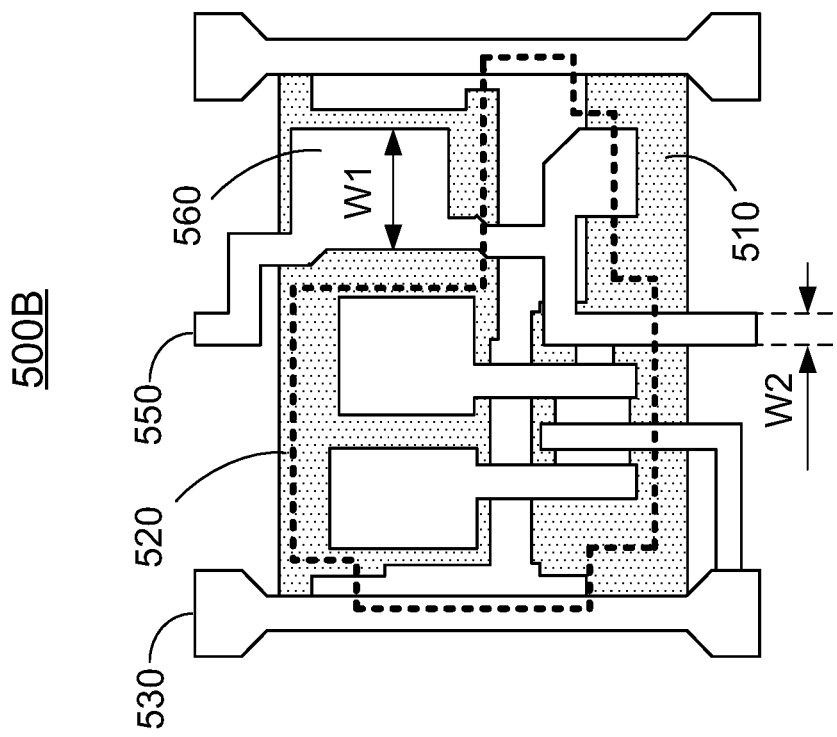
FIG. 5B schematically shows a second type sub-pixel according to one embodiment of the present disclosure.
Figure 5A:
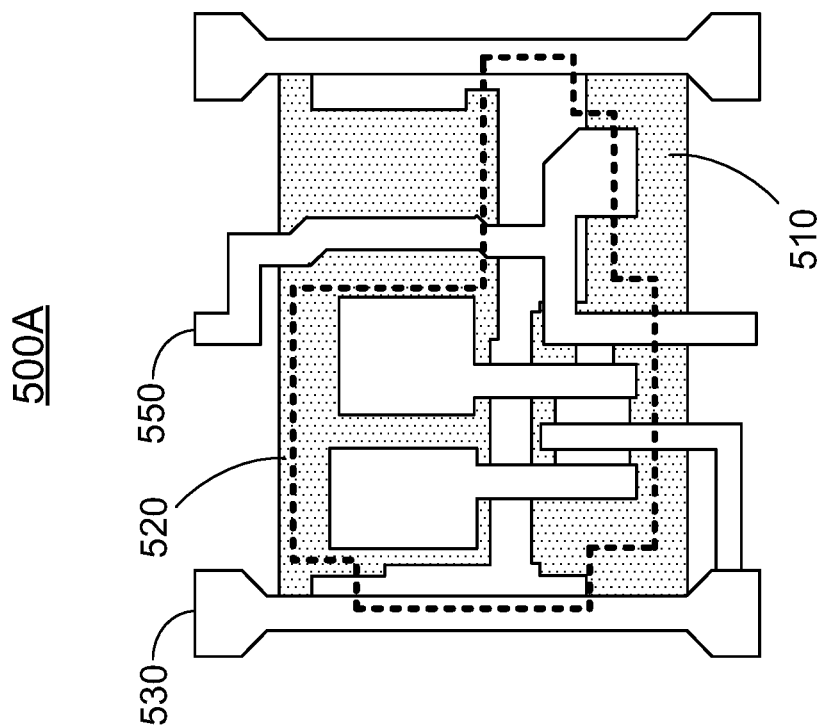
FIG. 5A schematically shows a first type sub-pixel according to one embodiment of the present disclosure.

FIG. 5A schematically shows a first type sub-pixel according to one embodiment of the present disclosure, and FIG. 5B schematically shows a second type sub-pixel according to one embodiment of the present disclosure. Specifically, FIGS. 5A and 5B respectively show the gate line 510, the array com line 520, the data line 530, and the common voltage line 550. The difference between the first type sub-pixel 500A and the second type sub-pixel 500B exists in that the second type sub-pixel 500B has the PS stage 560. As shown in FIG. 5B, the width W1 of the PS stages 560 on the metal layer (i.e., the array com line 520) along a horizontal direction (i.e., the direction perpendicular to the elongating direction of the common voltage lines 550) is substantially greater than the width W2 of the common voltage line 550.

Figure 6:
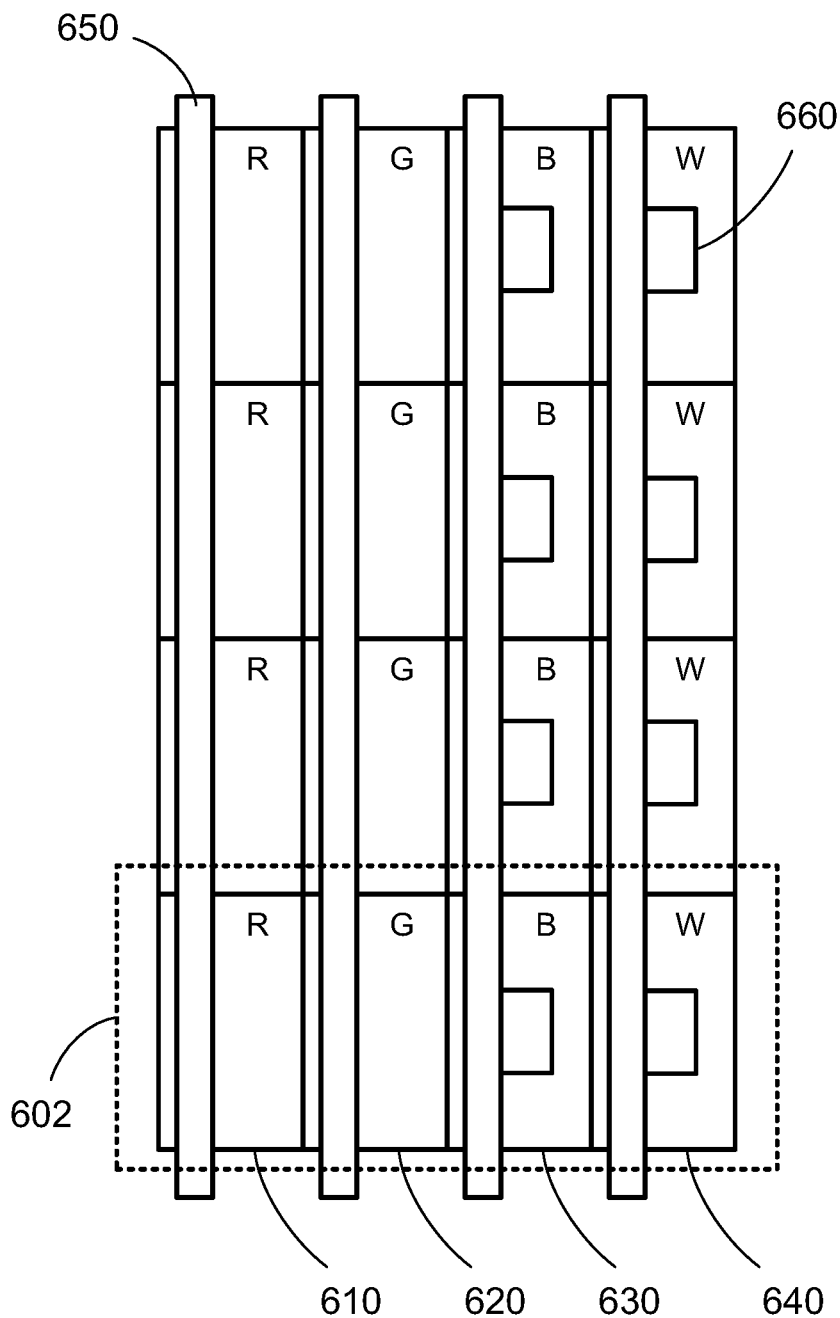
FIG. 6 schematically shows a top view of a plurality of pixels in consecutive rows when the arrangement of the sub-pixels are all in the same sequential order according to certain embodiments of the present disclosure.

It should be particularly noted that, as shown in FIGS. 2A, 3 and 4, the sub-pixels in different consecutive rows are arranged in different sequential orders, such that each column of the sub-pixels includes the same numbers of the first type sub-pixels 500A (the sub-pixels without stages, for example, R and G sub-pixels) and the same numbers of the second type sub-pixels 500B (the sub-pixels with stages, for example, B and W sub-pixels). In this case, each of the common voltage lines of the columns may have the same number of stages. The reason for arranging the sub-pixels in different sequential orders is to balance the loading of the common voltage lines. For example, FIG. 6 schematically shows a top view of a plurality of pixels in consecutive rows when the arrangement of the sub-pixels are all in the same sequential order according to certain embodiments of the present disclosure. As shown in FIG. 6, all of the pixels 602 in the pixel structure 600 have the same arrangement of sub-pixels in the sequential order of the R sub-pixel 610, the G sub-pixel 620, the B sub-pixel 630 and the W sub-pixel 640. In this case, all of the stages 660 will be provided on the third and fourth rows of the sub-pixels (corresponding to the B and W sub-pixels 630 and 640). Thus, the loadings of the common voltage lines 650 crossing the third and fourth rows of the sub-pixels (corresponding to the B and W sub-pixels 630 and 640) will be significantly greater than the loadings of the other common voltage lines 650, thus creating an imbalance of the loading and deteriorating the color display performance.

For the purposes of balancing the loadings of the common voltage lines, the arrangements of the sub-pixels may vary based on the number of pixel rows. For example, in a plurality of pixels arranged in a matrix having L rows and N columns, L and N being positive integers greater than one, the row number L may be L=2*M, where M is an integer greater than one. In this case, the pixels rows may be grouped together by two consecutive rows as shown in FIGS. 2A, 3 and 4. Alternatively, the row number L may be L=4*X, where X is an integer greater than one. In this case, the pixels rows may be grouped together by four consecutive rows.

Figure 7A:
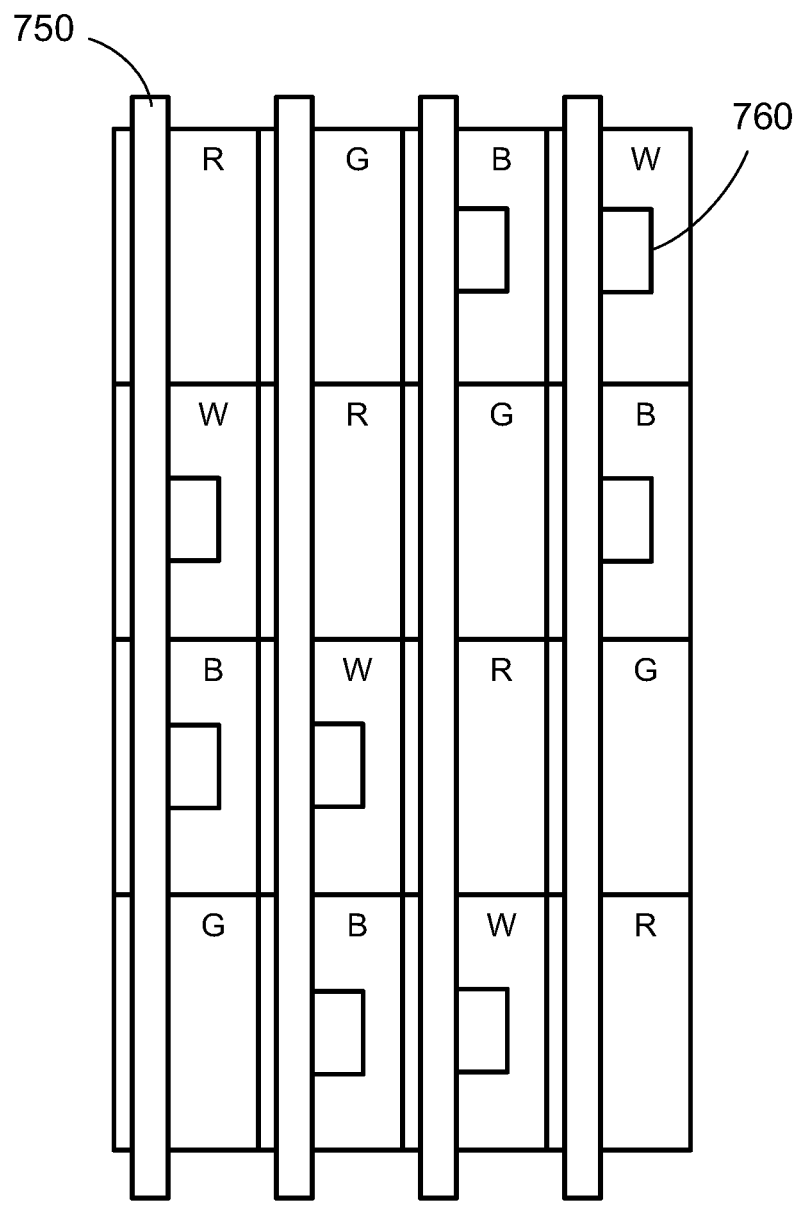
FIG. 7A schematically shows a top view of a plurality of pixels in consecutive rows according to certain embodiments of the present disclosure, where the sub-pixels of each row are arranged by shifting one sub-pixel forward from the previous row.

FIG. 7A schematically shows a top view of a plurality of pixels in consecutive rows according to certain embodiments of the present disclosure, where the sub-pixels of each row are arranged by shifting one sub-pixel forward from the previous row. As shown in FIG. 7A, for the first row, the sub-pixels are arranged in a sequential order of R-G-B-W. For the second row, the sub-pixels are arranged in a sequential order of W-R-G-B. For the third row, the sub-pixels are arranged in a sequential order of B-W-R-G. For the fourth row, the sub-pixels are arranged in a sequential order of G-B-W-R. In other words, for each row of the pixels, the arrangement is changed by shifting one sub-pixel forward from the previous row (i.e., moving the last sub-pixel in the previous row to the first, and pushing all the other three sub-pixels down in the sequential order). In this case, each column of the sub-pixels may still include the same numbers of the first type sub-pixels (R and G sub-pixels) and the same numbers of the second type sub-pixels (B and W sub-pixels), and each of the common voltage lines 750 may have the same number of stages 760.

Figure 7B:
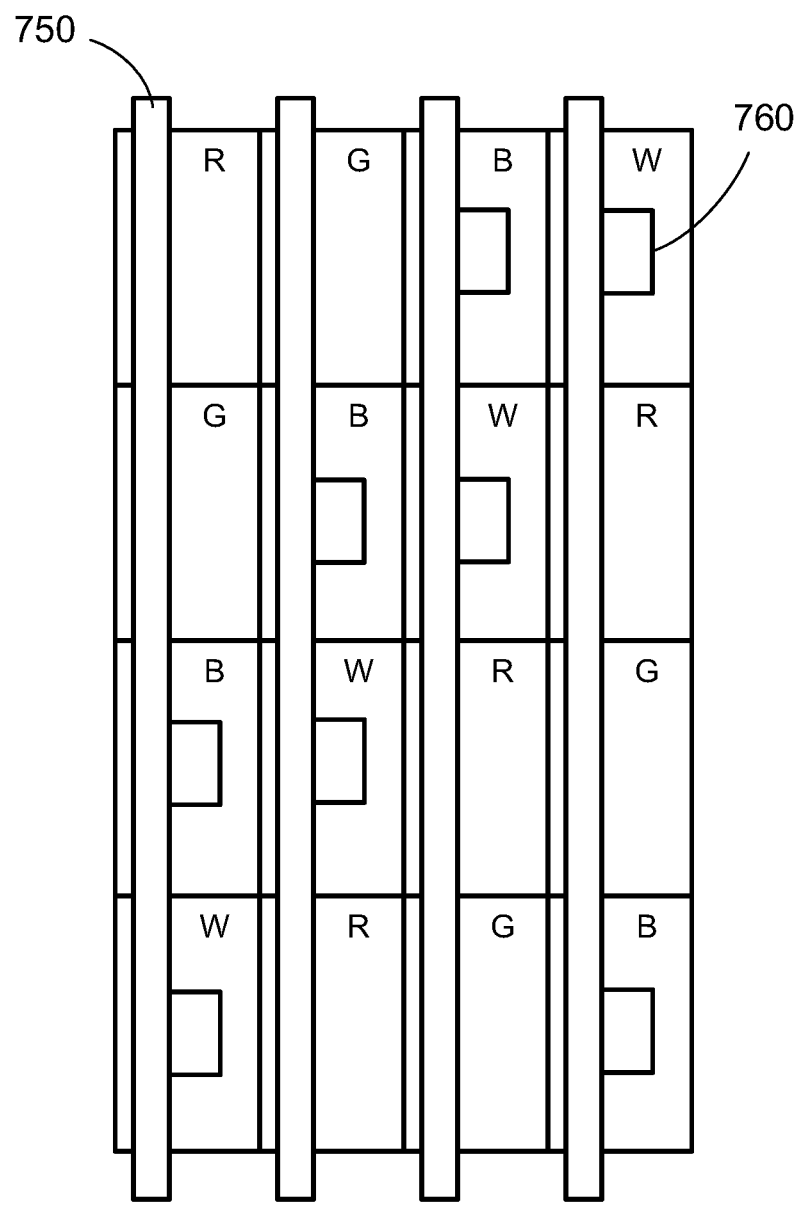
FIG. 7B schematically shows a top view of a plurality of pixels in consecutive rows according to certain embodiments of the present disclosure, where the sub-pixels of each row are arranged by shifting one sub-pixel backward from the previous row.

FIG. 7B schematically shows a top view of a plurality of pixels in consecutive rows according to certain embodiments of the present disclosure, where the sub-pixels of each row are arranged by shifting one sub-pixel backward from the previous row. As shown in FIG. 7B, for the first row, the sub-pixels are arranged in a sequential order of R-G-B-W. For the second row, the sub-pixels are arranged in a sequential order of G-B-W-R. For the third row, the sub-pixels are arranged in a sequential order of B-W-R-G. For the fourth row, the sub-pixels are arranged in a sequential order of W-R-G-B. In other words, for each row of the pixels, the arrangement is changed by shifting one sub-pixel backward from the previous row (i.e., moving the first sub-pixel in the previous row to the last, and pushing all the other three sub-pixels up in the sequential order). In this case, each column of the sub-pixels may still include the same numbers of the first type sub-pixels (R and G sub-pixels) and the same numbers of the second type sub-pixels (B and W sub-pixels), and each of the common voltage lines 750 may have the same number of stages 760.

Figure 7C:
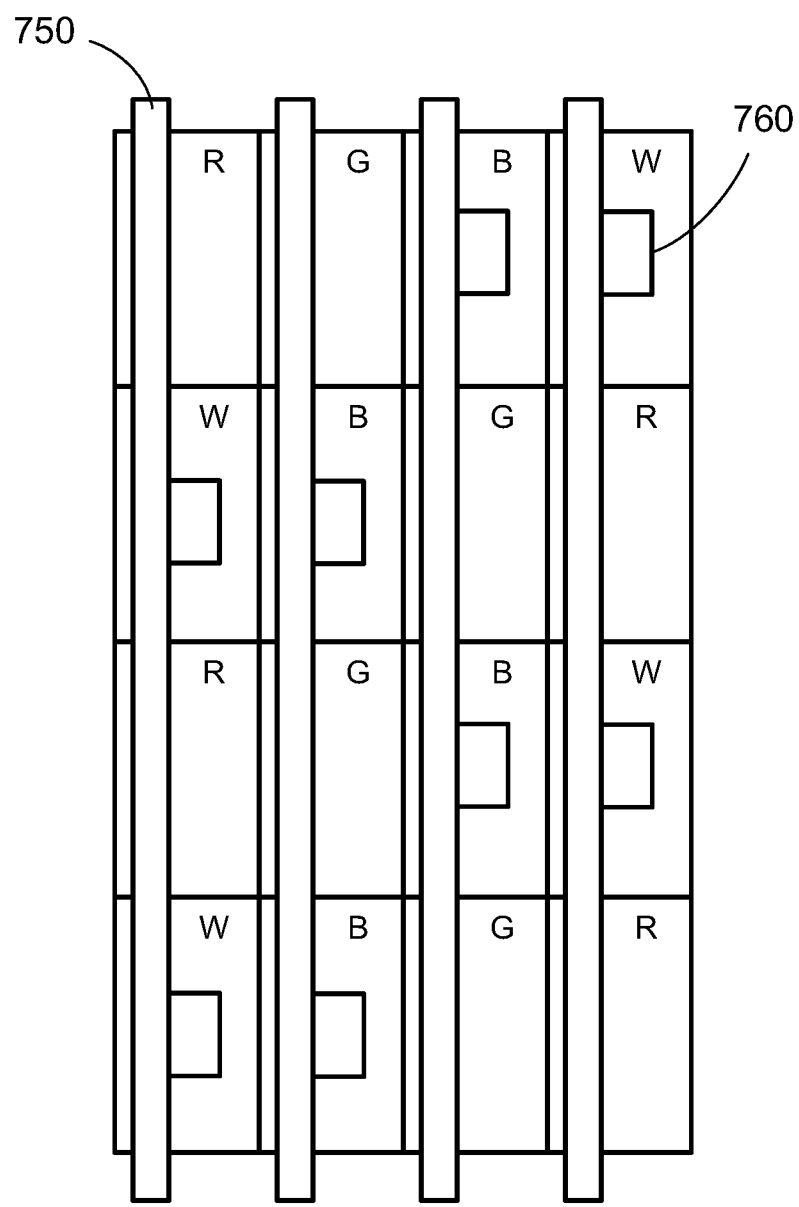
FIG. 7C schematically shows a top view of a plurality of pixels in consecutive rows according to certain embodiments of the present disclosure, where the sub-pixels for each two adjacent rows are arranged backwards from each other.

FIG. 7C schematically shows a top view of a plurality of pixels in consecutive rows according to certain embodiments of the present disclosure, where the sub-pixels for each two adjacent rows are arranged backwards from each other. As shown in FIG. 7C, for the first and third rows, the sub-pixels are arranged in a sequential order of R-G-B-W. For the second and fourth rows, the sub-pixels are arranged in a sequential order of W-B-G-R. In other words, for each row of the pixels, the sequential order of the sub-pixels is the opposite order from the sequential order of the previous row (i.e., the first sub-pixel in the previous row becomes the last, the second sub-pixel in the previous row becomes the second-to-last, etc.). In this case, each column of the sub-pixels may still include the same numbers of the first type sub-pixels (R and G sub-pixels) and the same numbers of the second type sub-pixels (B and W sub-pixels), and each of the common voltage lines 750 may have the same number of stages 760.

It should be particularly noted that, in the examples as shown in FIGS. 7A and 7B, each column of the sub-pixels may include both B and W sub-pixels. As discussed above, the B sub-pixel includes a photo spacer, and the W sub-pixel does not include a photo spacer. Thus, the stage 760 for each of the B sub-pixels is a PS stage, and the stage 760 for each of the W sub-pixels is not a PS stage. In this case, the common voltage lines 750 may be categorized as first common voltage lines and second common voltage lines. Each of the first common voltage lines includes first stages (PS stages for the B sub-pixels) and third stages (non-PS stages for the W sub-pixels), and each second common voltage lines includes second stages (non-PS stages for the W sub-pixels) and fourth stages (PS stages for the B sub-pixels). In contrast, for the example as shown in FIG. 7C, each column of the sub-pixels may include either the B sub-pixels (for the two middle columns) or the W sub-pixels (for the two side columns), but not both B and W sub-pixels. In this case, the common voltage lines 750 may be categorized as first common voltage lines and second common voltage lines. Each of the first common voltage lines (for the two middle columns) includes only the first stages (PS stages for the B sub-pixels), and each second common voltage lines (for the two side columns) includes the second stages (non-PS stages for the W sub-pixels).

Figure 8:
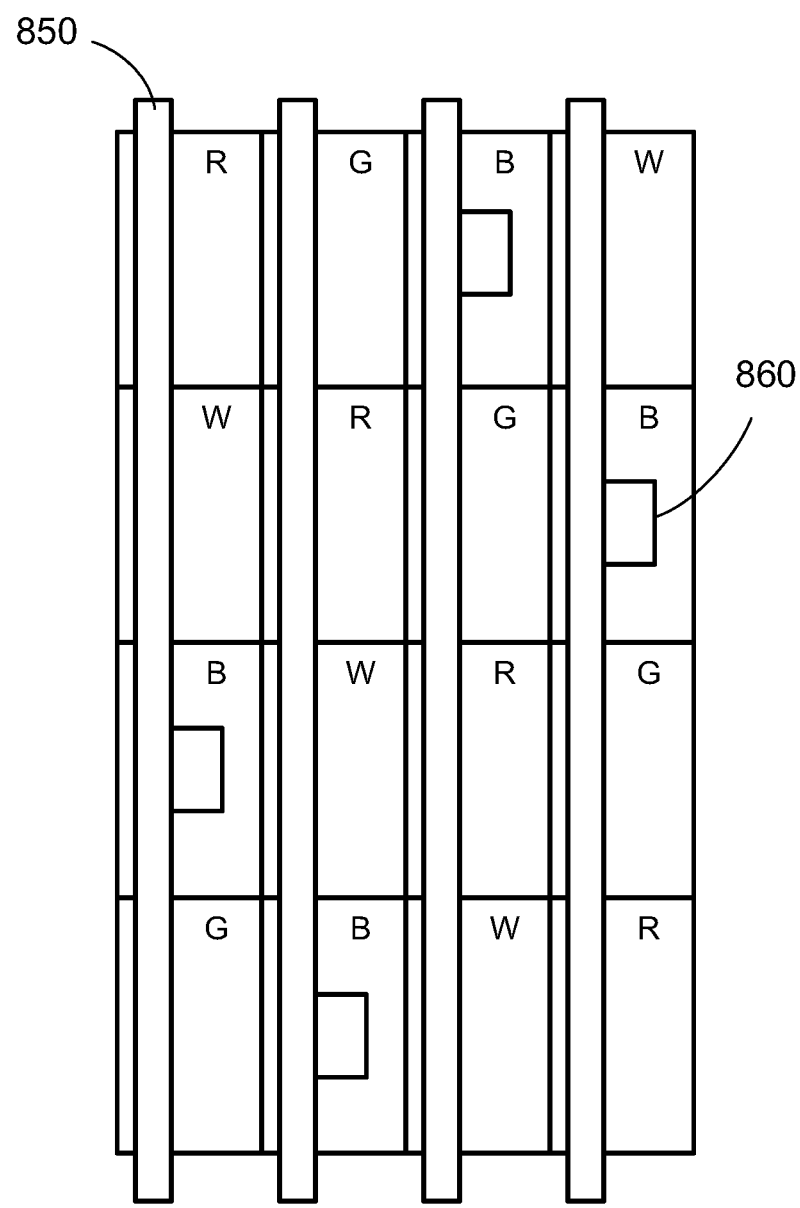
FIG. 8 schematically shows a top view of a plurality of pixels in consecutive rows according to certain embodiments of the present disclosure, where only the B sub-pixels include the PS stages, and the sub-pixels of each row are arranged by shifting one sub-pixel forward from the previous row.

FIG. 8 schematically shows a top view of a plurality of pixels in consecutive rows according to certain embodiments of the present disclosure, where only the B sub-pixels include the PS stages, and the sub-pixels of each row are arranged by shifting one sub-pixel forward from the previous row. In this case, only the B sub-pixels constitute the second type sub-pixels, and the R, G and W sub-pixels constitute the first type sub-pixels. The sequential orders of the sub-pixels as shown in FIG. 8 are exactly the same as the sequential orders of the sub-pixels as shown in FIG. 7A. In this case, for each column of sub-pixels, only one-fourth of the sub-pixels may be the B sub-pixels. Thus, each column of the sub-pixels may still include the same numbers of the first type sub-pixels (R, G and W sub-pixels) and the same numbers of the second type sub-pixels (B sub-pixels), and each of the common voltage lines 850 may have the same number of PS stages 860.

It should be particularly noted that the concept of balancing the loadings of the common voltage lines may be applied to different pixel structures utilizing different color models. In certain embodiments, the arrangements of the sub-pixels may vary based on the number of sub-pixels in one pixel. For example, in the RGB color model, the sub-pixels of a pixel may include K=3 sub-pixels, including a R sub-pixel, a G sub-pixel and a B sub-pixel. In this case, the R and G sub-pixels constitute the first type sub-pixels, and the B sub-pixels constitute the second type sub-pixels. Further, the row number L may be L=3*Z, where Z is an integer greater than one. In this case, the pixels rows may be grouped together by three consecutive rows.

Figure 9:
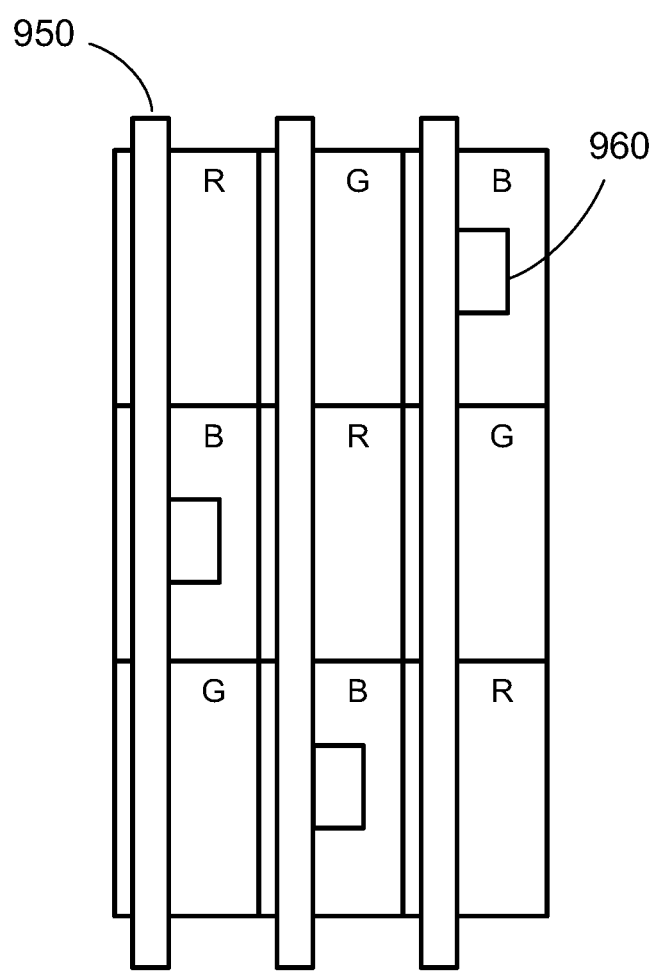
FIG. 9 schematically shows a top view of a plurality of pixels in consecutive rows according to certain embodiments of the present disclosure, where each pixel includes 3 sub-pixels, and the sub-pixels of each row are arranged by shifting one sub-pixel forward from the previous row.

FIG. 9 schematically shows a top view of a plurality of pixels in consecutive rows according to certain embodiments of the present disclosure, where each pixel includes 3 sub-pixels, and the sub-pixels of each row are arranged by shifting one sub-pixel forward from the previous row. As shown in FIG. 9, for the first row, the sub-pixels are arranged in a sequential order of R-G-B. For the second row, the sub-pixels are arranged in a sequential order of B-R-G. For the third row, the sub-pixels are arranged in a sequential order of G-B-R. In other words, for each row of the pixels, the arrangement is changed by shifting one sub-pixel forward from the previous row (i.e., moving the last sub-pixel in the previous row to the first, and pushing all the other two sub-pixels down in the sequential order). In this case, each column of the sub-pixels may still include the same numbers of the first type sub-pixels (R and G sub-pixels) and the same numbers of the second type sub-pixels (B sub-pixels), and each of the common voltage lines 950 may have the same number of PS stages 960.

In certain embodiments, the pixel structure and the arrangement of the sub-pixels and corresponding PS stage design as described above may be implemented in any of the display devices or apparatuses. For example, the display device may be a LCD adopting the BOA model, the COA model, or any other applicable models.

In sum, aspects of the disclosure, among other things, recite a pixel structure of a display device. In certain embodiments, the pixel structure includes: (a) a plurality of pixels arranged in a matrix having L rows and N columns, where each of the pixels includes K sub-pixels, L, N and K being integers greater than one, and the sub-pixels of each of the pixels include a plurality of first type sub-pixels and at least one second type sub-pixel; and (b) at least K*N common voltage lines, each electrically connected to a corresponding column of the sub-pixels. The sub-pixels are arranged along a row direction to form K*N columns of the sub-pixels. For each row of the matrix, the sub-pixels are arranged alternately such that each of the K*N columns of the sub-pixels comprises substantially the same numbers of the first type sub-pixels and substantially the same numbers of the second type sub-pixels. Each of the sub-pixels has a color resist of a corresponding color and a photo spacer disposed on the color resist. For each of the pixels, the color resists of the second type sub-pixels have a sectional difference from the color resists of the first type sub-pixels, and the sectional difference is greater than a height of the photo spacer of each of the first type sub-pixels. For each of the second type sub-pixels, a photo spacer (PS) stage is extended from the corresponding common voltage line, and the color resist of each of the second type sub-pixels is disposed on the corresponding PS stage to form the sectional difference. Thus, each of the common voltage lines has the same number of PS stages in order to balance the loading of the common voltage lines.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A pixel structure of a display device, comprising:
(a) a plurality of pixels arranged in a matrix having 2*M rows and N columns, M and N being integers greater than one, wherein each of the plurality of pixels comprises a plurality of sub-pixels, and the sub-pixels of each of the plurality of pixels comprise a red (R) sub-pixel, a green (G) sub-pixel, a blue (B) sub-pixel, and a white (W) sub-pixel, wherein:
the sub-pixels are arranged along a row direction to form 4*N columns of the sub-pixels;
for each of the plurality of pixels in the odd rows of the matrix, the sub-pixels of the pixel are arranged along the row direction in a first sequential order of the R sub-pixel, the G sub-pixel, the B sub-pixel and the W sub-pixel, and for each of the plurality of pixels in the even rows of the matrix, the sub-pixels of the pixel are arranged along the row direction in a second sequential order of the B sub-pixel, the W sub-pixel, the R sub-pixel and the G sub-pixel, such that each of the odd columns of the sub-pixels comprises M R sub-pixels and M B sub-pixels alternately disposed, and each of the even columns of the sub-pixels comprises M G sub-pixels and M W sub-pixels alternately disposed;
each of the sub-pixels has a color resist of the corresponding color;
each of the plurality of R, G and B sub-pixels has a photo spacer disposed on the color resist; and
the color resists of the B sub-pixels and the W sub-pixels have a sectional difference from the color resists of the R sub-pixels and the G sub-pixels, and the sectional difference is greater than a height of the photo spacer of each of the R and G sub-pixels;
(b) at least 4*N common voltage lines, each electrically connected to a corresponding column of the sub-pixels;
wherein for each of the B sub-pixels and the W sub-pixels, a stage is extended from the corresponding common voltage line, and the color resist of each of the B and W sub-pixels is disposed on the corresponding stage to form the sectional difference, such that each of the common voltage lines has M stages.

2. The pixel structure of claim 1, further comprises:
(a) at least 2*M gate lines, each electrically connected to a corresponding row of the pixels;
(b) at least 2*M array com lines, each electrically connected to a corresponding row of the pixels; and
(c) at least 4*N data lines, each electrically connected to a corresponding column of the sub-pixels.

3. A pixel structure of a display device, comprising:
(a) a plurality of pixels arranged in a matrix having L rows and N columns, wherein each of the plurality of pixels comprises K sub-pixels, L, N and K being integers greater than one, and the sub-pixels of each of the plurality of pixels comprise a plurality of first type sub-pixels and at least one second type sub-pixel, wherein:
the sub-pixels are arranged along a row direction to form K*N columns of the sub-pixels;

for each row of the matrix, the sub-pixels are arranged alternately such that each of the K*N columns of the sub-pixels comprises substantially the same numbers of the first type sub-pixels and substantially the same numbers of the second type sub-pixels;

each of the sub-pixels has a color resist of a corresponding color, wherein the color resist of each of the first type sub-pixels has a first height, and the color resist of each of the second type sub-pixels has a second height;

each of the first type sub-pixels and at least one of the second type sub-pixels respectively have a photo spacer disposed on the color resist; and for each of the plurality of pixels, the color resists of the second type sub-pixels have a sectional difference from the color resists of the first type sub-pixels, and the second height is greater than the first height;

(b) at least K*N common voltage lines, each electrically connected to a corresponding column of the sub-pixels;

wherein for each of the second type sub-pixels, a stage is extended from the corresponding common voltage line, and the color resist of each of the second type sub-pixels is disposed on the corresponding stage to form the sectional difference, such that each of the common voltage lines has substantially the same number of stages.

4. The pixel structure of claim 3, further comprises:
(a) at least L gate lines, each electrically connected to a corresponding row of the pixels;
(b) at least L array com lines, each electrically connected to a corresponding row of the pixels; and
(c) at least K*N data lines, each electrically connected to a corresponding column of the sub-pixels.

5. The pixel structure of claim 3, wherein each of the pixels comprises K=4 sub-pixels, comprising a first sub-pixel corresponding to a first color, a second sub-pixel corresponding to a second color, a third sub-pixel corresponding to a third color, and a fourth sub-pixel corresponding to a fourth color, wherein the first and second sub-pixels are the first type sub-pixels, and the third and fourth sub-pixels are the second type sub-pixels.

6. The pixel structure of claim 5, wherein the matrix has L=2*M rows, M being an integer greater than one,
wherein for each of the pixels in the odd rows of the matrix, the sub-pixels of the pixel are arranged along the row direction in a first sequential order of the first sub-pixel, the second sub-pixel, the third sub-pixel and the fourth sub-pixel, and for each of the pixels in the even rows of the matrix, the sub-pixels of the pixel are arranged along the row direction in a second sequential order of the third sub-pixel, the fourth sub-pixel, the first sub-pixel and the second sub-pixel, such that each of the odd columns of the sub-pixels comprises M first sub-pixels and M third sub-pixels alternately disposed, and each of the even columns of the sub-pixels comprises M second sub-pixels and M fourth sub-pixels alternately disposed.

7. The pixel structure of claim 5, wherein the matrix has L=4*X rows, X being an integer greater than one,
wherein for each row of the pixels, the arrangement of the sub-pixels changes such that each of the two adjacent sub-pixels in two adjacent rows corresponds to two different colors, and each of the columns of the sub-pixels comprises 2*X first type sub-pixels and 2*X second type sub-pixels.

8. The pixel structure of claim 7, wherein for each row of the pixels, the sub-pixels are arranged by shifting one sub-pixel from a previous row, such that each of the columns of the sub-pixels comprises X first sub-pixels, X second sub-pixels, X third sub-pixels and X fourth sub-pixels alternately disposed.

9. The pixel structure of claim 7, wherein for each row of the pixels, the sub-pixels are arranged by shifting two sub-pixels from a previous row.

10. The pixel structure of claim 7, wherein for each of the two adjacent rows of the pixels, the sub-pixels of one row are arranged backwards from the sub-pixels of the other row, such that each of the columns of the sub-pixels comprises X first sub-pixels, X second sub-pixels, X third sub-pixels and X fourth sub-pixels alternately disposed.

11. The pixel structure of claim 3, wherein each of the pixels comprises K=3 sub-pixels, comprising a first sub-pixel corresponding to a first color, a second sub-pixel corresponding to a second color, and a third sub-pixel corresponding to a third color, wherein the first and second sub-pixels are the first type sub-pixels, and the third sub-pixel is the second type sub-pixel.

12. The pixel structure of claim 11, wherein the matrix has L=3*Z rows, Z being an integer greater than one,
wherein for each row of the pixels, the arrangement of the sub-pixels changes such that each of the two adjacent sub-pixels in two adjacent rows corresponds to two different colors, and each of the columns of the sub-pixels comprises 2*Z first type sub-pixels and Z second type sub-pixels.

13. The pixel structure of claim 12, wherein for each row of the pixels, the sub-pixels are arranged by shifting one sub-pixel from a previous row, such that each of the columns of the sub-pixels comprises Z first sub-pixels, Z second sub-pixels and Z third sub-pixels alternately disposed.

14. The pixel structure of claim 3, wherein each of the plurality of stages is stacked on metal layers, and each of the plurality of common voltage lines substantially elongates along an elongating direction, wherein a width of each of the plurality of stages on the metal layers along a direction perpendicular to the elongating direction is substantially greater than a width of each of the plurality of common voltage lines not stacked on the metal layers along the direction.

15. A pixel structure of a display device, comprising:
a plurality of photo spacers;
a first common voltage line elongating along an elongating direction, wherein a plurality of first stages extends from the first common voltage line, and each of the plurality of first stages elevates at least one of the plurality of photo spacer; and
a second common voltage line elongating along the elongating direction located by the first common voltage line, wherein a plurality of second stages extends from the second common voltage line, and each of the plurality of second stages is not stacked under any of the plurality of photo spacers.

16. The pixel structure of claim 15, wherein a first number of the first stages is substantially identical to a second number of the second stages.

17. The pixel structure of claim 16, wherein each of the first stages has a first width along a direction perpendicular to the elongating direction, and each of the second stages has a second width along the direction perpendicular to the elongating direction, wherein the first width and the second width are substantially identical.

18. The pixel structure of claim 15, wherein a plurality of third stages extends from the first common voltage line, each of the plurality of third stages is not stacked under any of the plurality of photo spacers, and a plurality of fourth stages extend from the second common voltage line, and each of the plurality of the fourth stages elevates at least one of the plurality of photo spacers; wherein a first sum of numbers of the first and third stages extending from the first common line is substantially identical to a second sum of numbers of the second and fourth stages.

19. The pixel structure of claim 18, wherein each of the first stages has a first width along a direction perpendicular to the elongating direction, each of the second stages has a second width along the direction perpendicular to the elongating direction, each of the third stages has a third width along the direction perpendicular to the elongating direction, and each of the fourth stages has a fourth width along the direction perpendicular to the elongating direction, wherein the first, second, third and fourth widths are substantially identical.

20. The pixel structure of claim 15, further comprising:
- a plurality of first color resists, each having a first height; and
- a plurality of second color resists, each having a second height, wherein each of the plurality of second color resists is stacked under at least one of the photo spacers;

wherein each of the plurality of second stages is stacked under one of the plurality of second color resists, and the second height of each of the second color resists is greater than the first height of each of the first color resists.

\* \* \* \* \*